US012719639B2

(12) United States Patent
Chung et al.

(10) Patent No.: US 12,719,639 B2
(45) Date of Patent: Aug. 25, 2026

(54) METHOD AND APPARATUS FOR TRANSMITTING AND RECEIVING BLOCK ACK IN WIRELESS COMMUNICATION SYSTEM SUPPORTING MULTI-LINK

(71) Applicant: SAMSUNG ELECTRONICS CO., LTD., Suwon-si (KR)

(72) Inventors: Chulho Chung, Suwon-si (KR); Jonghun Han, Suwon-si (KR); Seunghwan Oh, Suwon-si (KR); Kyungik Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 269 days.

(21) Appl. No.: 18/387,313

(22) Filed: Nov. 6, 2023

(65) Prior Publication Data

US 2024/0154764 A1 May 9, 2024

(30) Foreign Application Priority Data

Nov. 8, 2022 (KR) ........................ 10-2022-0148139

(51) Int. Cl.
*H04L 5/00* (2006.01)
*H04L 1/1607* (2023.01)

(52) U.S. Cl.
CPC .......... *H04L 5/0053* (2013.01); *H04L 1/1671* (2013.01); *H04L 5/0044* (2013.01)

(58) Field of Classification Search
CPC ... H04L 5/0053; H04L 1/1671; H04L 5/0044; H04L 1/1614; H04L 1/1685; H04L 1/1861; H04L 1/1858; H04L 1/1864; H04L 69/14; H04W 76/15; H04W 84/12
See application file for complete search history.

(56) References Cited

U.S. PATENT DOCUMENTS

| | | | |
|---|---|---|---|
| 8,774,088 B2 | 7/2014 | Gong et al. | |
| 9,398,579 B2 | 7/2016 | Sampath et al. | |
| 10,057,747 B2 | 8/2018 | Alpert et al. | |
| 10,959,153 B2 | 3/2021 | Patil et al. | |
| 11,076,385 B2 | 7/2021 | Huang et al. | |
| 2018/0184233 A1* | 6/2018 | Alpert | H04L 5/001 |
| 2019/0082373 A1* | 3/2019 | Patil | H04L 1/1614 |
| 2021/0409156 A1 | 12/2021 | Xu et al. | |

(Continued)

FOREIGN PATENT DOCUMENTS

KR 10-2021-0007897 A 1/2021

OTHER PUBLICATIONS

"Draft Standard for Information technology—Telecommunications and information exchange between systems Local and metropolitan area networks—Specific requirements", IEEE P802.11be$^{TM}$/D2.0, Part 11: Wireless LAN Medium Access Control (MAC) and Physical Layer (PHY) Specifications, May 2022, 873 pages.

*Primary Examiner* — Rina C Pancholi
(74) *Attorney, Agent, or Firm* — Sughrue Mion, PLLC

(57) ABSTRACT

An operating method of a first multi-link device (MLD), including: transmitting, by the first MLD, first data to a second MLD using a first link, wherein the first MLD is configured to communicate with the second MLD using the first link and a second link; and receiving, by the first MLD, a first acknowledgement (ACK) with respect to the first data through the second link and not through the first link.

18 Claims, 23 Drawing Sheets

(56) References Cited

U.S. PATENT DOCUMENTS

2022/0182184 A1 6/2022 Wang et al.
2022/0322473 A1 10/2022 Hwang et al.
2023/0011167 A1 * 1/2023 Chitrakar .......... H04W 74/0816
2023/0155641 A1 * 5/2023 Kim ...................... H04W 76/15
370/252

* cited by examiner

FIG. 4B

| Order | Information |
|---|---|
| 1 | Category |
| 2 | Block ACK Action |
| 3 | Dialog Token |
| 4 | Block ACK Parameter Set |
| 5 | Block ACK Timeout Value |
| 6 | Block ACK Starting Sequence Control |
| 7 | GCR Group Address element |
| 8 | Multi-band |
| 9 | TCLAS |
| 10 | ADDBA Extension |
| 11 | ACK Separation |

FIG. 4C

| B0 | B1 | B2 B5 | B6 B15 |
|---|---|---|---|
| A-MSDU Supported | Block ACK Policy | TID | Buffer Size |
| 1 | 1 | 4 | 10 |

FIG. 5D

| Octets | 2 | 2 | 6 | 0 or 6 | 0 or 6 | 0 or 2 | 0 or 6 | 0 or 2 | 0 or 4 |
|---|---|---|---|---|---|---|---|---|---|
| | Frame Control | Duration /ID | Address 2 | Address 2 | Address 3 | Sequence Control | Address 4 | QoS Control | HT Control |

MAC header

FIG. 5E

| Applicable frame (sub)types | Bits 0~3 | Bit 4 | Bit 5~6 | Bit 7 | Bit 7 | Bit 9 | Bit 10 | Bit 11~15 |
|---|---|---|---|---|---|---|---|---|
| QoS CF-Poll and QoS CF-Ack+CF-Poll frames sent by HC | TID | EOSP | ACK Policy Indicator | Reserved | TXOP Limit | | | |
| QoS Data+CF-Poll and QoS Data+CF-Ack+CF-Poll frames sent by HC | TID | EOSP | ACK Policy Indicator | A-MSDU Presect | TXOP Limit | | | |
| QoS Data and QoS Data +CF-Ack frames sent by HC | TID | EOSP | ACK Policy Indicator | A-MSDU Presect | AP PS Buffer State | | | |
| QoS Null frames snet by HC | TID | EOSP | ACK Policy Indicator | Reserved | AP PS Buffer State | | | |

METHOD AND APPARATUS FOR TRANSMITTING AND RECEIVING BLOCK ACK IN WIRELESS COMMUNICATION SYSTEM SUPPORTING MULTI-LINK

CROSS-REFERENCE TO RELATED APPLICATION

This application is based on and claims priority under 35 U.S.C. § 119 to Korean Patent Application No. 10-2022-0148139, filed on Nov. 8, 2022, in the Korean Intellectual Property Office, the disclosure of which is incorporated by reference herein in its entirety.

BACKGROUND

1. Field

The disclosure relates to a method and apparatus for transmitting and receiving block acknowledgement (ACK) in a wireless communication system supporting multi-link, and more particularly to a method of separating a data transmission link and a block ACK reception link in a wireless communication system supporting multi-link.

2. Description of Related Art

A wireless local area network (WLAN) may refer to technology for inter-connecting two or more devices by using a wireless signal transmission scheme, for example based on the Institute of Electrical and Electronics Engineers (IEEE) 802.11 standard. The 802.11 standard has evolved into 802.11b, 802.11a, 802.11g, 802.11n, 802.11ac, 802.11ax, or the like.

Furthermore, 802.11be, which may be referred to as extremely high throughput (EHT), is a next-generation WLAN standard which attempts to implement support of the 6 GHz unlicensed frequency band, using a maximum bandwidth of 320 MHz per channel, introducing of a multiple resource unit (MRU), 4096-quadrature amplitude modulation (QAM), or the like. By doing so, a next-generation WLAN system may effectively support low latency and ultrahigh-speed transmission as in New Radio (NR), which is $5^{th}$ generation (5G) technology.

802.11be may support a multi-link operation (MLO) in which data is transmitted and received using one or more links. Therefore, there is a demand for a scheme which increases performance of the MLO.

SUMMARY

Provided is an apparatus for a block acknowledgement (ACK) in a wireless communication system supporting multi-link, and an operating method of the apparatus.

Additional aspects will be set forth in part in the description which follows and, in part, will be apparent from the description, or may be learned by practice of the presented embodiments.

In accordance with aspect of the disclosure, an operating method of a first multi-link device (MLD) includes transmitting, by the first MLD, first data to a second MLD using a first link, wherein the first MLD is configured to communicate with the second MLD using the first link and a second link; and receiving, by the first MLD, a first acknowledgement (ACK) with respect to the first data through the second link and not through the first link.

In accordance with aspect of the disclosure, an operating method of a first multi-link device (MLD) includes transmitting an aggregated-media access control protocol data unit (A-MPDU) with respect to a first traffic identification (TID) to a second MLD using a plurality of links; and receiving a block acknowledgement (ACK) with respect to the A-MPDU from the second MLD using a second link and without using the plurality of links, and wherein the second link is different from the plurality of links.

In accordance with aspect of the disclosure, a first multi-link device (MLD) includes a transceiver; and a processor coupled with the transceiver and configured to: control the transceiver to transmit first data to a second MLD using a first link, wherein the first MLD is configured to communicate with the second MLD using the first link and a second link, and receive a first acknowledgement (ACK) with respect to the first data through the second link and not through the first link.

BRIEF DESCRIPTION OF DRAWINGS

The above and other aspects, features, and advantages of certain embodiments of the present disclosure will be more apparent from the following description taken in conjunction with the accompanying drawings, in which:

FIG. 4B illustrates an example of an add block acknowledgement (ADDBA) request frame according to an embodiment;

FIG. 4C illustrates an example of a block acknowledgement (ACK) parameter set according to an embodiment;

FIG. 5D illustrates an example of a medium access control (MAC) header according to an embodiment;

FIG. 5E illustrates an example of a quality of service (QoS) control field according to an embodiment;

DETAILED DESCRIPTION OF EMBODIMENTS

Hereinafter, embodiments will be described in detail with reference to the attached drawings.

Figure 1:
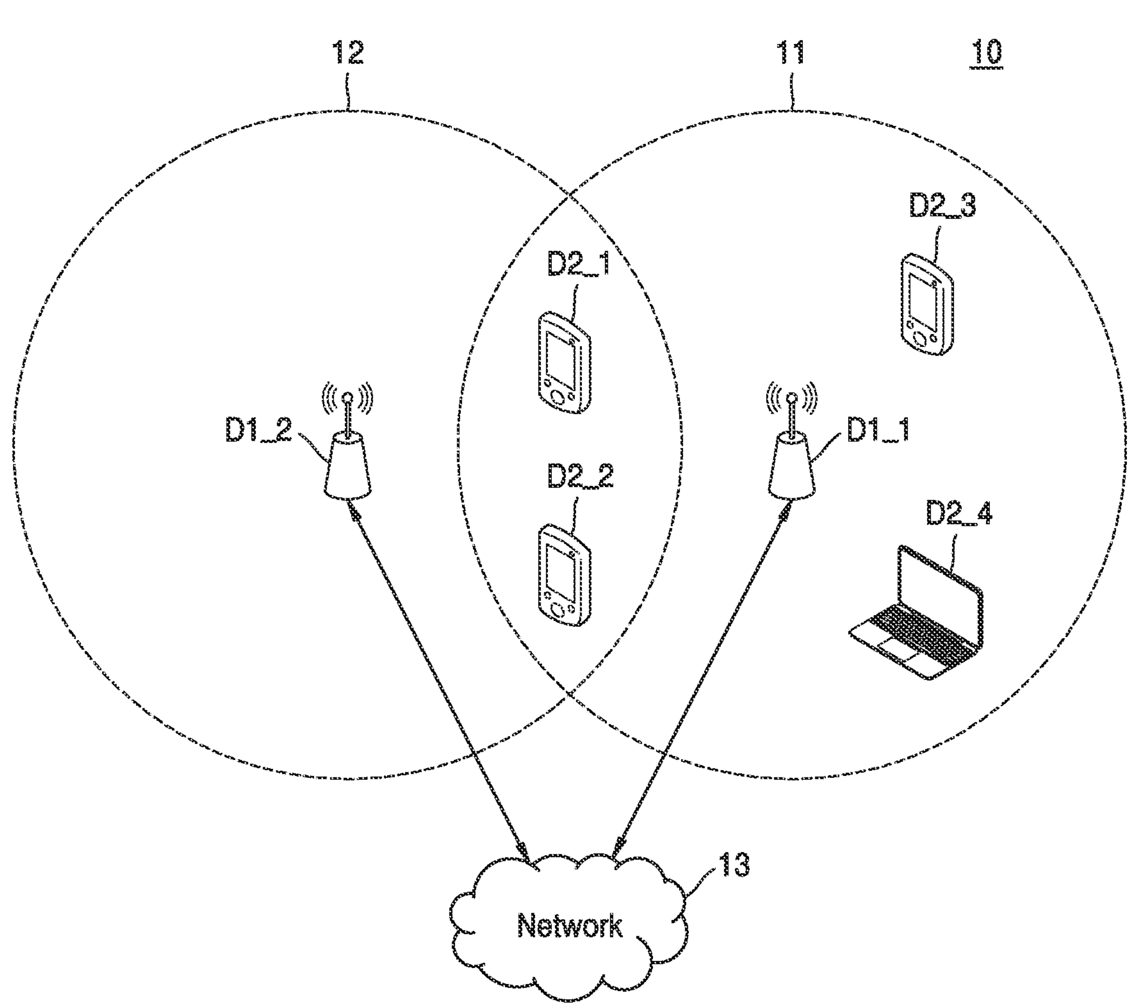
FIG. 1 illustrates a wireless communication system according to an embodiment.

FIG. 1 illustrates a wireless communication system 10 according to an embodiment. In more detail, FIG. 1 illustrates a wireless local area network (WLAN) as an example of the wireless communication system 10.

Hereinafter, embodiments are described based on orthogonal frequency division multiplexing (OFDM) or an OFDM-based wireless communication system, particularly, the Institute of Electrical and Electronic Engineers (IEEE) 802.11 standard, however, embodiments may be modified without departing from the scope of the disclosure, and may be applied to other communication systems (for example, a cellular communication system including long term evolution (LTE), LTE-advanced (LTE-A), New Radio (NR), wireless broadband (WiBro), global system for mobile communication (GSM), or a short-range communication system such as Bluetooth and near field communication (NFC)) having similar technical backgrounds and channel types.

Also, various functions described below may be implemented or supported by artificial intelligence (AI) technology or one or more computer programs, and each of the computer programs is composed of computer-readable program code executed in computer-readable recording media. The terms "application" and "program" may refer to one or more computer programs, a software component, an instruction set, a procedure, a function, an object, a class, an instance, or related data, or their part appropriate for implementation of appropriate computer-readable program code. The term "computer-readable program code" includes any type of computer code including source code, object code, and execution code. The term "computer-readable medium" includes any type of medium, such as read-only memory (ROM), random access memory (RAM), hard disks, compact disks (CDs), digital video disks (DVDs), and other types of memory, which are accessible by a computer. A "non-transitory" computer-readable medium excludes communication links which transmit transitory signals. The non-transitory computer-readable medium includes a medium in which data may be permanently stored, and a medium such as rewritable optical disks or erasable memory devices in which data may be stored and overwritten at a later time.

In various embodiments described below, a hardware approach is explained as an example. However, various embodiments include a technique using both hardware and software and do not exclude a software approach.

Referring to FIG. 1, the wireless communication system 10 may include first device D1_1, second device D1_2, third device D2_1, fourth device D2_2, fifth device D2_3, and sixth device D2_4. The first and second devices D1_1 and D1_2 may access a network 13, which may include the internet, an internet protocol (IP) network, or any other network. The first device D1_1 may access the network 13 within a first coverage area 11. The first device D1_1 may provide an access to the network 13 to the third to sixth devices D2_1, D2_2, D2_3, and D2_4 within the first coverage area 11, and the second device D1_2 may provide an access to the network 13 to the third and fourth devices D2_1 and D2_2 within a second coverage area 12.

In embodiments, the first and second devices D1_1 and D1_2 may communicate with at least one of the third to sixth devices D2_1, D2_2, D2_3, and D2_4 by using multi-link, based on wireless fidelity (WiFi) or any other WLAN access technology. The first and second devices D1_1 and D1_2 may each correspond to an access point (AP) multi-link device (MLD), and the third to sixth devices D2_1, D2_2, D2_3, and D2_4 may each correspond to a non-AP MLD. In embodiments, the AP MLD may be a device capable of supporting a plurality of APs, and the non-AP MLD may be a device capable of supporting a plurality of stations (STAs).

In some embodiments, the first and second devices D1_1 and D1_2 may each be referred to as a router, a gateway, or the like, and the third to sixth devices D2_1, D2_2, D2_3, and D2_4 may each be referred to as a terminal, a mobile terminal, a wireless terminal, a user equipment (UE), or the like. Also, the third to sixth devices D2_1, D2_2, D2_3, and D2_4 may each be a mobile device such as a mobile phone, a laptop computer, a wearable device, or the like, or a stationary device such as a desktop computer, a smart TV, or the like.

The AP MLD may allocate at least one resource unit (RU) to at least one non-AP MLD. The AP MLD may transmit data using an allocated at least one RU, and the non-AP MLD may receive the data using an allocated at least one RU. According to 802.11be, which may be referred to as extremely high throughput (EHT), or next-generation IEEE 802.11 standards, which may be referred to as EHT+, the AP MLD may allocate, to at least one non-AP MLD, a multi-resource unit (MRU) including two or more RUs. For example, the first device D1_1 may allocate an MRU to at least one of the third to sixth devices D2_1, D2_2, D2_3, and D2_4, and may transmit data using the allocated MRU.

In some embodiments, the first device D1_1 and the third device D2_1 may communicate with each other using a plurality of links. The first device D1_1 may transmit data to the third device D2_1 using one or more links. The third device D2_1 may receive data using one or more links, and may transmit acknowledgement (ACK) to the first device D1_1 using one or more links different from the reception link. In this manner, the first device D1_1 and the third device D2_1 according to an embodiment may transmit or receive ACK using a link different from a link through which data is transmitted. For example, a link through which data is transmitted may be separate from a link through which ACK is transmitted. Also, as a link through which data is transmitted is separate from a link in which ACK is transmitted in a multi-link operation (MLO), performance of the MLO may be increased, and a data throughput between the first device D1_1 and the third device D2_1 may be increased.

Figure 2:
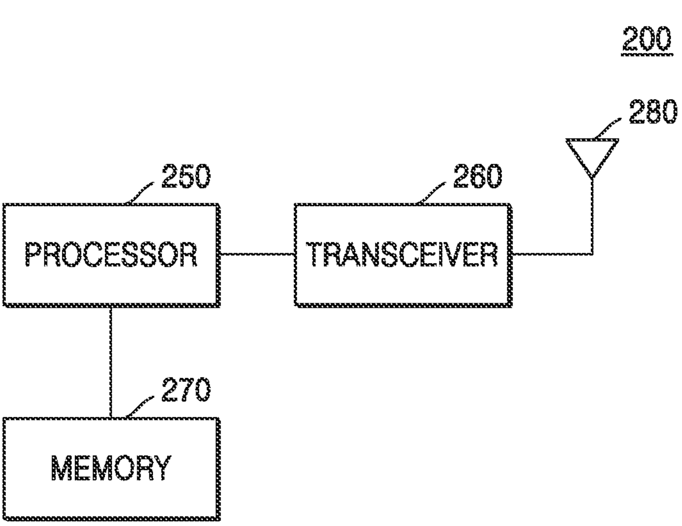
FIG. 2 illustrates a wireless communication apparatus according to an embodiment.

FIG. 2 illustrates a wireless communication apparatus 200 according to an embodiment. FIG. 2 may be described with reference to FIGS. 3 and 4A below.

The wireless communication apparatus 200 of FIG. 2 may be included in a transmission apparatus (e.g., Access Point (AP)) or a reception apparatus (e.g., Station (STA)). For example, the wireless communication apparatus 200 of FIG. 2 may be included in one of an AP such as first device D1_1 and second device D1_2, and an STA such as third device D2_1, fourth device D2_2, fifth device D2_3 and sixth device D2_4 shown in FIG. 1, and may be applied to a sensor used in a computer, a smartphone, a portable electronic device, a tablet, a wearable device, or an Internet of Things (IoT) device.

Referring to FIG. 2, the wireless communication apparatus 200 of FIG. 2 may be configured to include a processor 250, a transceiver 260, a memory 270, and an antenna 280.

The processor 250 may control all operations of the transceiver 260, and may write data to or read data from the memory 270. The transceiver 260 may transmit and receive a wireless signal, and may be controlled by the processor 250.

When the wireless communication apparatus 200 is included in a transmission apparatus (e.g., when the wireless communication apparatus 200 performs a transmission function), the transceiver 260 may generate a physical layer convergence protocol (PLCP) protocol data unit (PPDU) including a preamble and a payload, and may transmit the generated PPDU to a reception apparatus.

In embodiments, when the wireless communication apparatus 200 is included in a reception apparatus (e.g., when the wireless communication apparatus 200 performs a reception function), the transceiver 260 may receive a PPDU including a preamble and a payload from a transmission apparatus. Then, the transceiver 260 may decode the payload, based on the preamble of the received PPDU. For example, the transceiver 260 may perform decoding on the preamble of the PPDU using an internal decoder, and may decode the payload of the PPDU, based on a result of the decoding.

The memory 270 may store basic programs, application programs, and data such as configuration information, etc. for operations of the wireless communication apparatus 200. Accordingly, the memory 270 may store instructions and/or data associated with the processor 250 and the transceiver 260.

The antenna 280 may be connected to the transceiver 260, and may transmit a signal provided from the transceiver 260 to other wireless communication device, for example a terminal or a base station, or may provide a signal received from the other wireless communication device to the transceiver 260.

For example, the wireless communication apparatus 200 may be a first MLD 410. The first MLD 410 may include the transceiver 260 and the processor 250 connected to the transceiver 260. The processor 250 may determine whether to separate a first link and a second link, based on at least one of a state of links and a bandwidth, the first link including at least one link for data transmission and the second link including at least one link for ACK reception. The processor 250 may control the transceiver 260 to transmit, to a second MLD 420, a frame including information indicating a result of the link separation. Then, the processor 250 may control the transceiver 260 to receive, from the second MLD 420, a response to the frame. The processor 250 may control the transceiver 260 to transmit data to the second MLD 420 using the first link, based on the result of the link separation. The processor 250 may control the transceiver 260 to receive an ACK with respect to the data using the second link.

Figure 3:
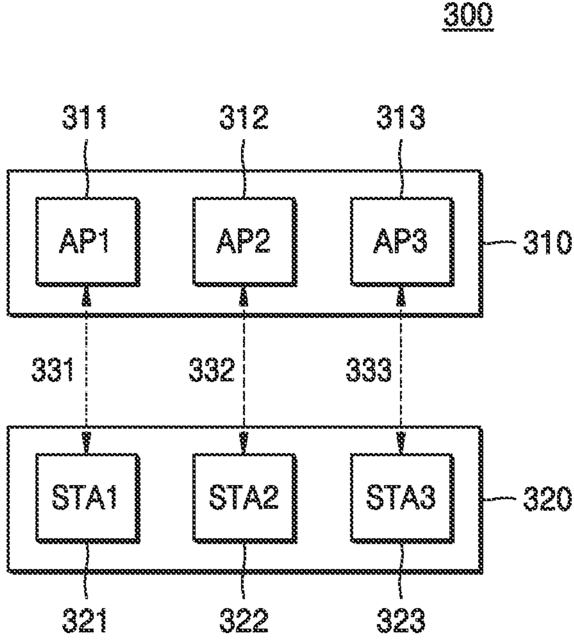
FIG. 3 illustrates a multi-link communication system according to an embodiment.

FIG. 3 illustrates a multi-link communication system 300 according to an embodiment.

The multi-link communication system 300 may include one or more MLDs. The multi-link communication system 300 may be compatible with a multi-link protocol of IEEE 802.11be.

In more detail, the multi-link communication system 300 may include one or more AP MLDs 310 and one or more non-AP MLDs 320. For example, an MLD may operate as any one of the AP MLD 310 and the non-AP MLD 320. The AP MLDs 310 may include one or more APs (e.g., an AP1 311, an AP2 312, and an AP3 313). The non-AP MLDs 320 may include one or more STAs (e.g., an STA1 321, an STA2 322, and an STA3 323). The AP MLD 310 and the non-AP MLD 320 may establish a multi-link. For example, the AP MLD 310 and the non-AP MLD 320 may establish first link 331, second link 332, and third link 333. In more detail, the AP1 311 of the AP MLD 310 may exchange data with the STA1 321 of the non-AP MLD 320 using the first link 331 based on a frequency band of 2.4 GHz. The AP2 312 of the AP MLD 310 may exchange data with the STA2 322 of the non-AP MLD 320 using the second link 332 based on a frequency band of 5 GHz. The AP3 313 of the AP MLD 310 may exchange data with the STA3 323 of the non-AP MLD 320 using the third link 333 based on a frequency band of 6 GHz.

As described above, the AP MLD 310 and the non-AP MLD 320 may exchange data using a multi-link. Such an operation may be referred to as an MLO. The number of APs included in the AP MLD 310 and the number of STAs included in the non-AP MLD 320 are not limited to the embodiment above, and thus, may vary. Also, the frequency bands of the first link 331, the second link 332, and the third link 333 are not limited to the embodiment above, and a combination of frequency bands of the first link 331, the second link 332, and the third link 333 may vary.

Figure 4A:
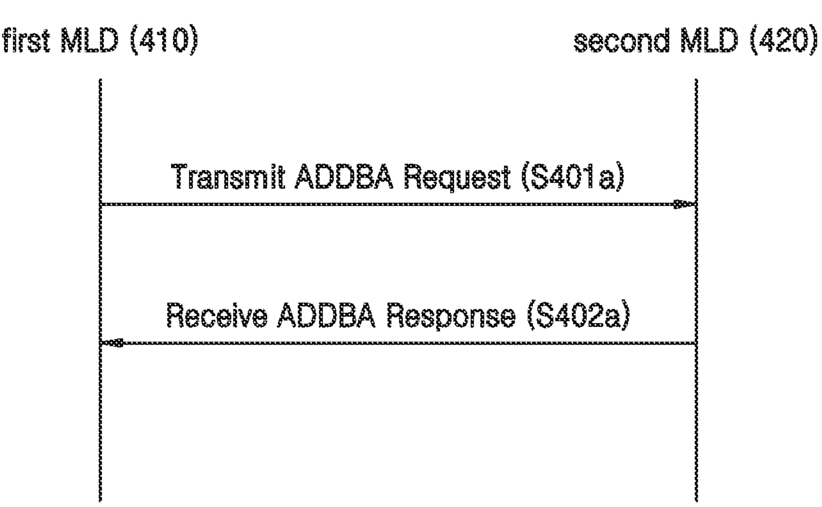
FIG. 4A illustrates an operation procedure of a multi-link device (MLD) according to an embodiment.
Figure 4C:
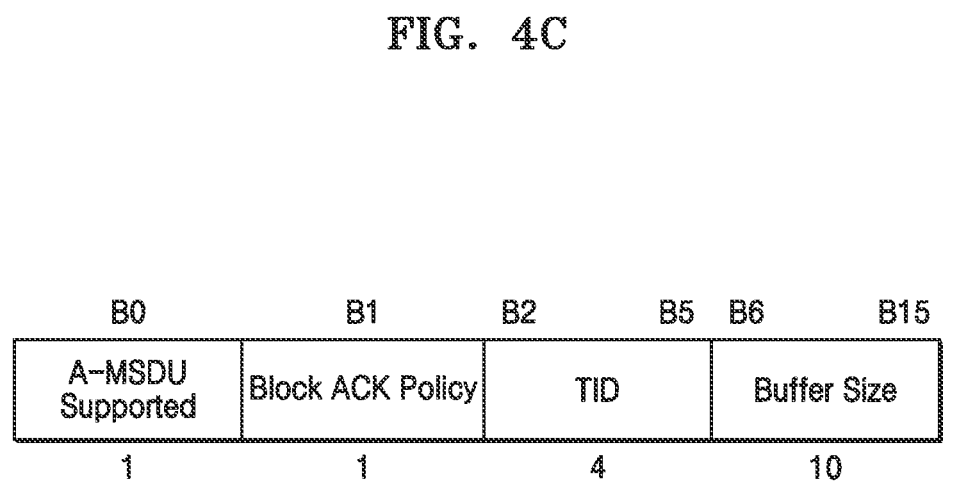

FIG. 4A illustrates an operation procedure of an MLD according to an embodiment. FIG. 4B illustrates an example of an add block acknowledgement (ADDBA) request frame. As shown in FIG. 4B, one or more of the fields may be not included in the ADDBA request frame, or may only be included when a corresponding function is used. For example, in embodiments an ADDBA request frame may not include one or more of the groupcast with retries (GCR) group address element field, the multi-band field, the traffic classification (TCLAS) field, and the ADDBA extension field. FIG. 4C illustrates an example of a block ACK parameter set. FIG. 4A may be described with reference to FIG. 3.

A first MLD 410 and a second MLD 420 may each operate as the AP MLD 310 or the non-AP MLD 320. When the first MLD 410 and the second MLD 420 transmit data, each of them may be referred to as an originator, and when they receive data, each of them may be referred to as a recipient.

The first MLD 410 and the second MLD 420 may transmit or receive a plurality of media access control protocol data units (MPDUs) and ACK in response thereto. The plurality of MPDUs may be transmitted in the form of an aggregated-MPDU (A-MPDU). The first MLD 410 and the second MLD 420 may use a block ACK mechanism in order to efficiently transmit or receive ACK with respect to the plurality of MPDUs. In order for the first MLD 410 and the second MLD 420 to transmit or receive an A-MPDU with respect to particular traffic identification (TID), there is a need to establish a block ACK session between the first MLD 410 and the second MLD 420.

In a WLAN system, a packet may correspond to a video, a voice, or a data stream. Each of the video, the voice, and the data stream may have a different priority at an AP. TID may be an identifier used to classify the packet, and may be a part of a quality of service (QoS) concept.

In order for the first MLD 410 and the second MLD 420 to establish the block ACK session therebetween, the first MLD 410 and the second MLD 420 may perform a block ACK agreement procedure, an example of which is described below. Also, the first MLD 410 and the second MLD 420 may transmit and receive, in the block ACK agreement procedure, a parameter for separating a link for transmission and reception of data and a link for transmission and reception of a block ACK with respect to the data. For example, while performing the block ACK agreement procedure, the first MLD 410 and the second MLD 420 may indicate that a link associated with data is to be separate from a link associated with block ACK. Accordingly, the first MLD 410 may release a restriction requiring that block ACK with respect to data has to be received using a link for transmission of the data. The second MLD 420 may release a restriction requiring that block ACK with respect to data has to be transmitted using a link for reception of the data.

Referring to FIG. 4A, in operation S401*a*, the first MLD 410 may transmit an ADDBA request frame to the second MLD 420.

For example, the first MLD 410 may transmit, to the second MLD 420, an ADDBA request frame, in which a new field associated with separation of a data transmission link and a block ACK reception link is added, for example added to an ADDBA request frame shown as an example in FIG. 4B. The new field associated with separation of a data transmission link and a block ACK reception link may indicate that a link through which the first MLD 410 transmits data to the second MLD 420 may be different from a link through which the first MLD 410 receives block ACK from the second MLD 420. For example, the first MLD 410 may transmit the ADDBA request frame including the field to the second MLD 420, and thus, may release a restriction requiring that block ACK has to be received using a link through which data is transmitted.

As another example, the first MLD 410 may transmit, to the second MLD 420, an ADDBA request frame including a block ACK parameter set field as in FIG. 4C. Referring to FIG. 4C, when a Block ACK Policy bit is 1, the Block ACK Policy bit may indicate immediate Block ACK. When the Block ACK Policy bit is 0, the Block ACK Policy bit may indicate that it is not delayed block ACK but is a probability that a link for transmission of data may be separate from a link for reception of block ACK with respect to the data, with respect to the MLD of 802.11be (e.g., an EHT MLD). For example, the first MLD 410 may transmit an ADDBA request frame where the Block ACK Policy bit is 0 to the second MLD 420, and thus, may release a restriction requiring that ACK has to be received using a link through which data has been transmitted.

As another example, the first MLD 410 may transmit, to the second MLD 420, an ADDBA request frame where a reserved bit of an ADDBA capabilities field indicates a probability of separation between a data transmission link and a block ACK reception link. For example, the first MLD 410 transmits the ADDBA request frame to the second MLD 420, thereby releasing restriction requiring that block ACK has to be received using a link through which data has been transmitted.

In operation S402*a*, the first MLD 410 may receive an ADDBA response from the second MLD 420. The second MLD 420 may transmit an ADDBA response frame to the first MLD 410, in response to the received ADDBA request frame. Also, the second MLD 420 may determine separation between a data reception link and a block ACK transmission link, and may transmit an ADDBA response frame associated with link separation to the first MLD 410.

For example, the second MLD 420 may transmit, to the first MLD 410, an ADDBA response frame in which a new field associated with separation between the data reception link and the block ACK transmission link is added. The new field associated with separation between the data reception link and the block ACK transmission link may indicate that a link through which the second MLD 420 receives data from the first MLD 410 may be different from a link through which the second MLD 420 transmits block ACK to the first MLD 410. For example, the second MLD 420 transmits the ADDBA response frame to the first MLD 410, thereby releasing restriction requiring that block ACK has to be transmitted using a link through which data has been received.

As another example, the second MLD 420 may transmit, to the first MLD 410, an ADDBA response frame including a block ACK parameter set field. When Block ACK Policy bit is 1, the Block ACK Policy bit may indicate immediate block ACK. When the Block ACK Policy bit is 0, the Block ACK Policy bit may indicate that it is not delayed block ACK but is a probability that a link for reception of data may be separate from a link for transmission of block ACK with respect to the data, with respect to the MLD of 802.11be (e.g., the EHT MLD). For example, the second MLD 420 may transmit an ADDBA response frame where the Block ACK Policy bit is 0 to the first MLD 410, and thus, may release a restriction requiring that a block ACK has to be transmitted using a link through which data has been received.

As another example, the second MLD 420 may transmit, to the first MLD 410, an ADDBA response frame where a reserved bit of an ADDBA capabilities field indicates a probability of separation between a data reception link and a block ACK transmission link. For example, the second MLD 420 transmits the ADDBA response frame to the first MLD 410, thereby releasing a restriction requiring that a block ACK has to be transmitted using a link through which data has been received.

Figure 4D:
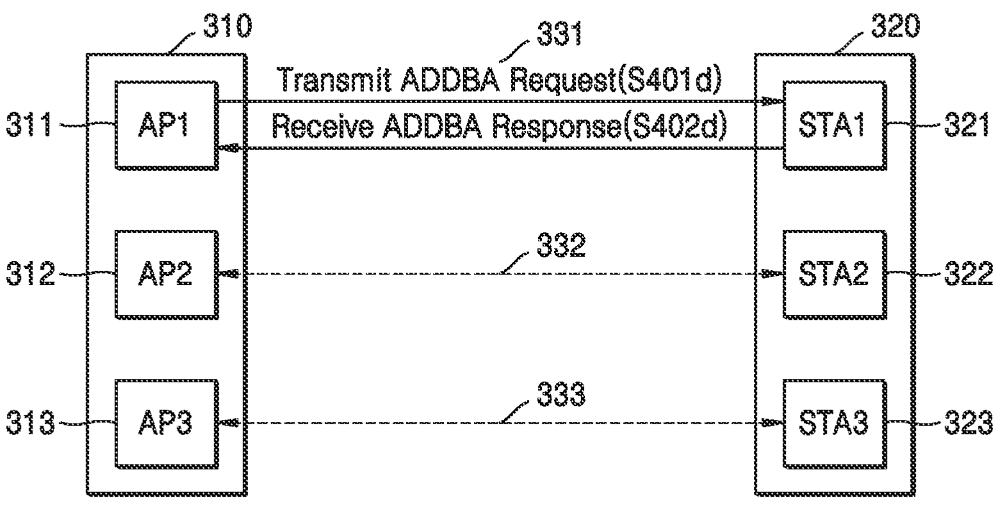
FIG. 4D illustrates an operation procedure of an AP MLD and a non-AP MLD according to an embodiment.

FIG. 4D illustrates an operation procedure of an AP MLD and a non-AP MLD according to an embodiment. FIG. 4D may be described with reference to FIG. 3.

Referring to FIG. 4D, in operation S401*d*, the AP1 311 of the AP MLD 310 may transmit an ADDBA request frame to the STA1 321 of the non-AP MLD 320 using the first link 331.

The AP MLD 310 may check states of the first link 331, the second link 332, and the third link 333 which are established with the non-AP MLD 320. For example, the AP MLD 310 may check a ratio of an idle time to a busy time of each of the first link 331, the second link 332, and the third link 333. The AP MLD 310 may determine, based on the checked link states, to transmit data to the non-AP MLD 320 using the first link 331 and to receive block ACK with respect to the data using the second link 332. Accordingly, in order to release a restriction requiring that a data transmission link has to be the same as a block ACK reception link, the AP MLD 310 may transmit an ADDBA reception frame in which a new field associated with separation between the data transmission link and the block ACK reception link is added.

In another embodiment, when the Block ACK Policy bit is 0, the AP MLD 310 may transmit an ADDBA request frame indicating that it is not delayed block ACK but is a probability that a link for reception of data may be separate from a link for transmission of a block ACK with respect to the data, with respect to the MLD of 802.11be (e.g., the EHT MLD).

As another example, the AP MLD 310 may transmit, to the non-AP MLD 320, an ADDBA request frame where a reserved bit of an ADDBA capabilities field indicates a probability of separation between a data transmission link and a block ACK reception link.

The AP MLD 310 may indicate, to the non-AP MLD 320 by various signaling, separation between a data transmission link and a block ACK reception link, but embodiments are not limited thereto.

In operation S402*d*, the AP1 311 may receive an ADDBA response frame from the STA1 321 using the first link 331. The non-AP MLD 320 may transmit the ADDBA response frame to the AP MLD 310, in response to the received ADDBA request frame. Also, the non-AP MLD 320 may determine separation between a data reception link and a block ACK transmission link, and may transmit an ADDBA response frame associated with link separation to the AP MLD 310.

The non-AP MLD 320 may check states of the first link 331, the second link 332, and the third link 333. The non-AP MLD 320 may determine, based on the states of the first link 331, the second link 332, and the third link 333, to separate a block ACK transmission link and a data reception link. Accordingly, the non-AP MLD 320 may transmit, to the AP MLD 310, an ADDBA response frame for releasing a restriction requiring that the data reception link and the block ACK transmission link have to be the same.

For example, the second MLD 420 may transmit, to the first MLD 410, an ADDBA response frame in which a new field associated with separation between the data reception link and the block ACK transmission link is added.

As another example, when the Block ACK Policy bit is 0, the second MLD 420 may transmit, to the first MLD 410, an ADDBA response frame indicating that it is not delayed block ACK but is a probability that a link for reception of data may be separate from a link for transmission of block ACK with respect to the data, with respect to an MLD (of 802.11be (e.g., an EHT MLD).

As another example, the non-AP MLD 320 may transmit, to the AP MLD 310, an ADDBA response frame where a reserved bit of an ADDBA capabilities field indicates a probability of separation between a data reception link and a block ACK transmission link. For example, the non-AP MLD 320 transmits the ADDBA response frame to the AP MLD 310, thereby releasing a restriction requiring that block ACK has to be transmitted using a link through which data has been received.

The non-AP MLD 320 may indicate, to the AP MLD 310 by various signaling, separation between a data link and a block ACK link, but embodiments are not limited thereto.

Figure 4E:
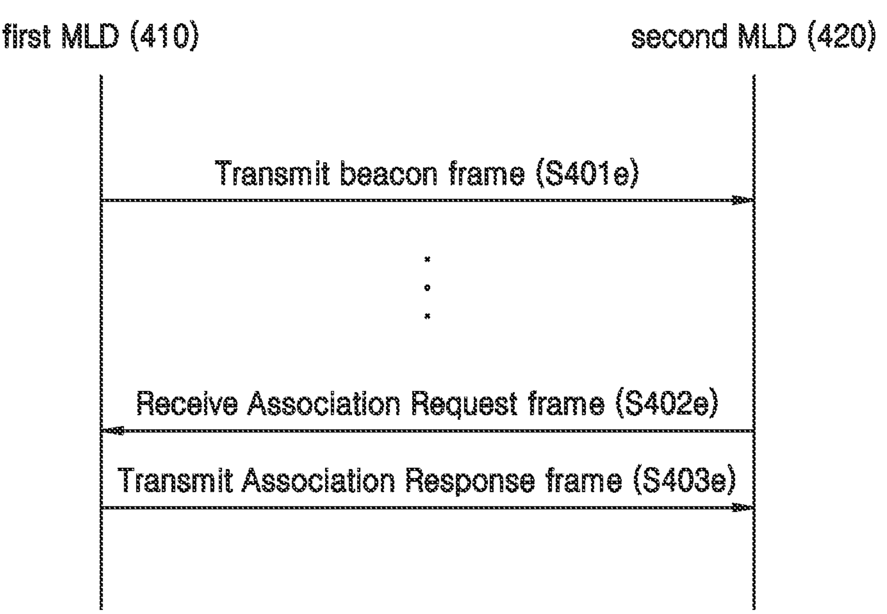
FIG. 4E illustrates an operation procedure of a first MLD and a second MLD according to an embodiment.

FIG. 4E illustrates an operation procedure of a first MLD and a second MLD according to an embodiment.

The first MLD 410 and the second MLD 420 may each operate as the AP MLD 310 or the non-AP MLD 320. The first MLD 410 and the second MLD 420 may transmit various frames to release restriction requiring that a data transmission link and a block ACK reception link have to be equal in a channel access procedure.

Referring to FIG. 4E, in operation S401*e*, the first MLD 410 may transmit a beacon frame to the second MLD 420. Here, a reserved bit of an EHT capabilities element or an EHT+ capabilities element of the beacon frame may indicate separation between the data transmission link and the block ACK reception link.

In embodiments, the second MLD 420 may transmit a probe request frame to the first MLD 410, and in response thereto, the first MLD 410 may transmit a probe response frame to the second MLD 420. The second MLD 420 may transmit an authentication request frame to the first MLD 410, and in response thereto, the first MLD 410 may transmit an authentication response frame to the second MLD 420.

In operation S402*e*, the first MLD 410 may receive an association request frame from the second MLD 420. Here, a reserved bit of an EHT capabilities element or an EHT+ capabilities element of the association request frame may indicate separation between the data transmission link and the block ACK reception link. In operation S403*e*, the first MLD 410 may transmit an association response frame to the second MLD 420.

The transmission of the beacon frame in operation S401*e* and the transmission of the association request frame in operation S402*e* may be independently performed, and there is no need to perform both operations in order to release a restriction requiring that the data transmission link and the block ACK reception link have to be the same.

Figure 5A:
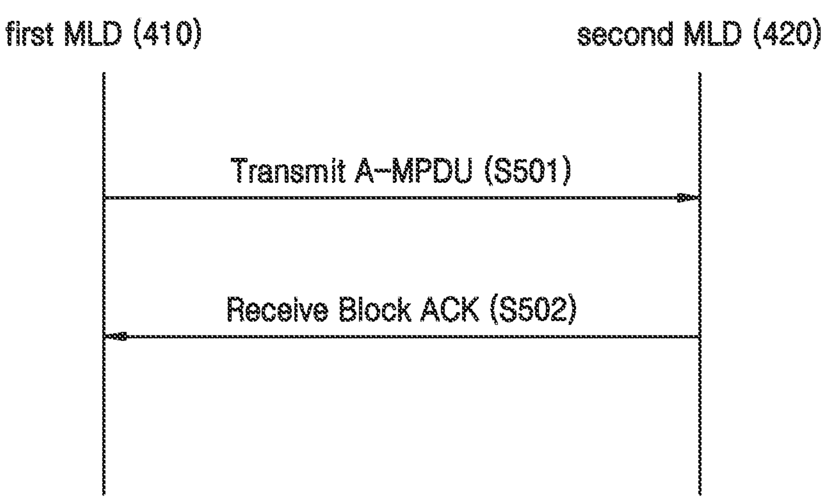
FIG. 5A illustrates an operation procedure of a first MLD and a second MLD according to an embodiment.
Figure 5B:
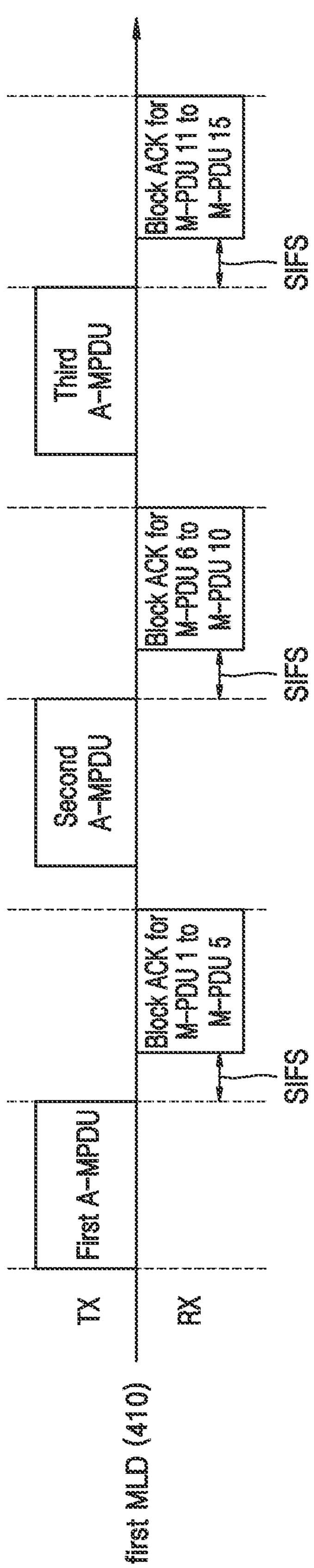
FIG. 5B illustrates an example in which ACK policy is implicit block ACK request (BAR) according to an embodiment.
Figure 5C:
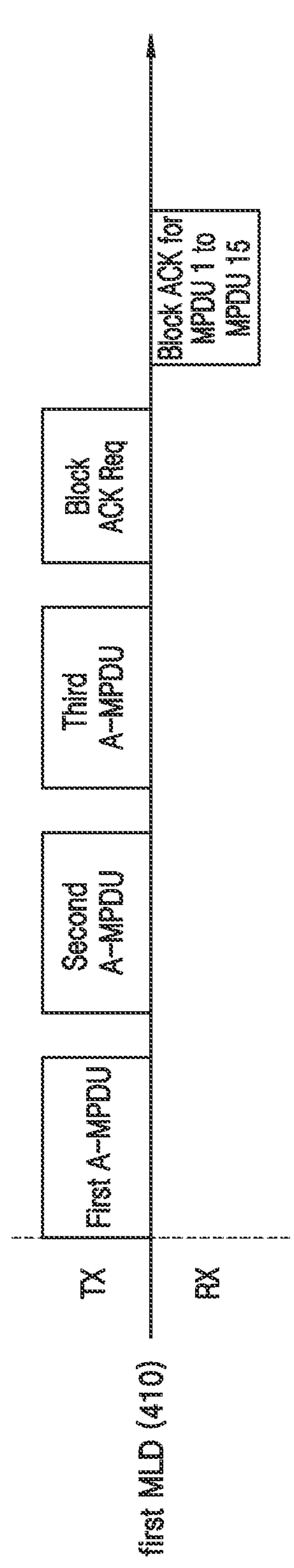
FIG. 5C illustrates an example in which ACK policy is block ACK.

FIG. 5A illustrates an operation procedure of a first MLD and a second MLD according to an embodiment. FIG. 5B illustrates an example in which ACK policy is implicit block ACK request (BAR). FIG. 5C illustrates an example in which ACK policy is block ACK. FIG. 5D illustrates an example of a medium access control (MAC) header. FIG. 5E illustrates an example of a QoS control field. FIG. 5A may be described with reference to FIGS. 3 and 4A.

The first MLD 410 may provide a signal to release a restriction requiring that a data link and a block ACK link have to be equal, in a block ACK agreement procedure or a channel access procedure. Afterward, when the first MLD 410 transmits data to the second MLD 420, the first MLD 410 may indicate that an ACK link with respect to the data may be separate from a data link.

Referring to FIG. 5A, in operation S501, the first MLD 410 may transmit an A-MPDU to the second MLD 420. The A-MPDU may be one of the schemes of integrating Ethernet frames being sent to one destination. In the A-MPDU, a MAC header may be added to each frame, for example the MAC header shown in FIG. 5D.

After a block ACK session for particular TID is established, the first MLD 410 may transmit the A-MPDU for a particular TID to the second MLD 420 using one or more links. When the first MLD 410 transmits the A-MPDU to the second MLD 420, ACK policy may be configured for each MPDU. Each MPDU may indicate its ACK policy.

For convenience of descriptions, FIGS. 5B and 5C show that the A-MPDU is transmitted using one link, however embodiments are not limited thereto. FIG. 5B illustrates an example in which ACK policy is implicit BAR. In a case of implicit BAR, the second MLD 420 may receive at least one MPDU, and, after a short inter-frame space (SIFS), may transmit block ACK. For example, when the first MLD 410 transmits, to the second MLD 420, a first A-MPDU including MPDU 1 to MPDU 5, the second MLD 420 may receive the MPDU 1 to MPDU 5, and after SIFS, may transmit a block ACK with respect to the first A-MPDU, for example with respect to tMPDU 1 to MPDU 5, to the first MLD 410. The first MLD 410 may transmit the first A-MPDU including to the second MLD 420, and after SIFS, may receive the block ACK with respect to the first A-MPDU, for example with respect to MPDU 1 to MPDU 5 from the second MLD 420. Signaling as described above may also be performed on a second A-MPDU including MPDU 6 to MPDU 10, and a third A-MPDU including MPDU 11 to MPDU 15.

When ACK policy of one or more MPDUs included in an A-MPDU indicates implicit BAR, an MLD having received the A-MPDU has to respond to block ACK after SIFS. For example, referring to FIG. 5B, when ACK policy of only MPDU 4 in the first A-MPDU is implicit BAR, and ACK policy of the rest of the MPDUs in the first A-MPDU is block ACK, the second MLD 420 receives the first A-MPDU (and has to transmit, after SIFS, block ACK with respect to the the first A-MPDU to the first MLD 410.

FIG. 5C illustrates an example in which ACK policy is block ACK. In a case of block ACK, after the second MLD 420 receives a separate block ACK request frame or receives an MPDU indicating implicit BAR, the second MLD 420 may transmit block ACK to the first MLD 410. For example, the first MLD 410 may transmit, to the second MLD 420, a first A-MPDU including MPDU 1 to MPDU 5, a second A-MPDU including MPDU 6 to MPDU 10, and third A-MPDU including MPDU 11 to MPDU 15. Then, the first MLD 410 may transmit a block ACK request frame to the second MLD 420. The second MLD 420 may receive the block ACK request frame, and then may transmit, to the first MLD 410, block ACK with respect to the first A-MPDU, the second A-MPDU, and the third A-MPDU for example by transmitting a block ACK with respect to the first A-MPDU and the second A-MPDU, for example with respect to MPDU 1 to MPDU 15.

When each ACK policy of all MPDUs consisting of A-MPDU indicates block ACK, an MLD having received the A-MPDU may delay transmission of block ACK until a separate BAR frame is received at a later time.

The first MLD 410 may transmit, to the second MLD 420, A-MPDU further including ACK policy indicating that an A-MPDU transmission link may be different from a block ACK transmission link. For example, referring to FIGS. 5D and 5E, the first MLD 410 may indicate that an A-MPDU transmission link may be different from a block ACK transmission link, by using a most significant bit (MSB) of an AP Power Save (PS) Buffer State of a QoS control field of a MAC header. As another example, the first MLD 410 may indicate that an A-MPDU transmission link may be different from a block ACK transmission link, by using one of the fields of the MAC header. The first MLD 410 may release restriction on a block ACK link, by various signaling, and embodiments are not limited thereto.

Also, the first MLD 410 may transmit A-MPDU further including ACK policy indicating transmission of a block ACK using a particular link different from a link through which the A-MPDU is transmitted. For example, referring to FIGS. 5D and 5E, the first MLD 410 may transmit A-MPDU indicating transmission of the block ACK using a particular link different from a link through which the A-MPDU is transmitted, by using an AP PS Buffer State of a QoS control field of a MAC header. As another example, the first MLD 410 may transmit A-MPDU indicating transmission of the block ACK using a particular link different from a link through which the A-MPDU is transmitted, by using one of the fields of the MAC header.

Referring back to FIG. 5A, in operation S502, the first MLD 410 may receive, from the second MLD 420, block ACK with respect to the A-MPDU. The second MLD 420 having received the A-MPDU may transmit the block ACK with respect to the A-MPDU to the first MLD 410. In a case where the first MLD 410 transmits a block ACK request frame to the second MLD 420, the second MLD 420 may transmit, to the first MLD 410, block ACK in response thereto.

The first MLD 410 may transmit, to the second MLD 420, A-MPDU further including ACK policy indicating that an A-MPDU transmission link may be different from a block ACK transmission link. The second MLD 420 having received the A-MPDU including such ACK policy may transmit block ACK to the first MLD 410 using a link different from a link through which the A-MPDU is received. For example, the second MLD 420 may transmit block ACK using a link having a highest ratio of a busy time among links established with the first MLD 410. As another example, the second MLD 420 may transmit block ACK using a link with a smallest bandwidth among links established with the first MLD 410.

Also, the first MLD 410 may transmit A-MPDU further including ACK policy indicating transmission of a block ACK using a particular link different from a link through which the A-MPDU is transmitted. The second MLD 420 having received the A-MPDU may transmit the block ACK to the first MLD 410 using the indicated link.

Also, the first MLD 410 may transmit a block ACK request frame using a link different from a link through which A-MPDU has been transmitted, and the second MLD 420 may transmit block ACK with respect to the A-MPDU using the link through which the block ACK request frame is received.

Figure 6A:
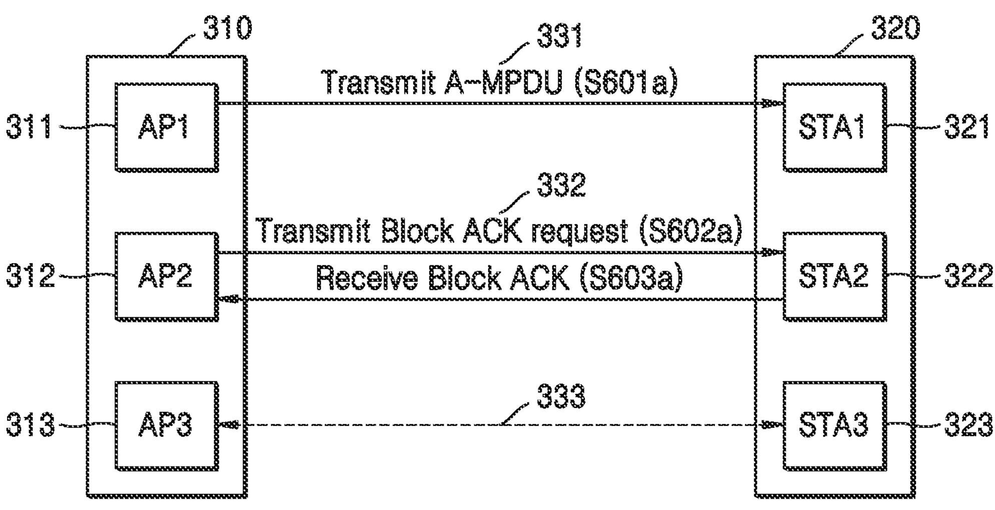
FIGS. 6A to 6F illustrate an example of communication between an access point (AP) multi-link device (MLD) and a non-AP MLD, according to an embodiment.

FIG. 6A illustrates an example of communication between an AP MLD and a non-AP MLD according to an embodiment. FIG. 6A may be described with reference to FIG. 3.

Hereinafter, embodiments are described in which A-MPDUs of FIGS. 6A to 6F are A-MPDUs with respect to the same TID, but embodiments are not limited thereto.

Referring to FIG. 6A, in operation S601$a$, the AP1 311 of the AP MLD 310 may transmit A-MPDU to the STA1 321 of the non-AP MLD 320. All MPDUs of the A-MPDU may include ACK Policy indicating block ACK, not implicit BAR. Also, the MPDUs of the A-MPDU may include additional ACK policy.

For example, the A-MPDU may further include ACK policy indicating that the first link 331 for transmission of the A-MPDU may be different from a link for transmission of block ACK.

As another example, the A-MPDU may further include ACK policy indicating reception of block ACK using the second link 332 that is different from the first link 331 for transmission of the A-MPDU.

In operation S602$a$, the AP2 312 of the AP MLD 310 may transmit a block ACK request frame to STA2 322.

In operation S603$a$, the AP2 312 may receive block ACK from the STA2 322.

For example, all MPDUs of A-MPDU which are received by the non-AP MLD 320 may include ACK Policy indicating block ACK, not implicit BAR. Accordingly, the non-AP MLD 320 may temporarily delay transmission of block ACK. Also, the non-AP MLD 320 may receive the block ACK request frame from the AP MLD 310, and after SIFS, may transmit block ACK to the AP MLD 310. When the A-MPDU indicates that the first link 331 for transmission of the A-MPDU is different from a link for transmission of block ACK, the STA2 322 may transmit block ACK to the AP2 312. For example, the non-AP MLD 320 may transmit block ACK using a link through which the block ACK request frame has been received.

As another example, the non-AP MLD 320 may receive, from the AP MLD 310 using the first link 331, A-MPDU including ACK policy indicating block ACK transmission using the second link 332. The non-AP MLD 320 may receive a block ACK request frame from the AP MLD 310 using the second link 332, and may transmit block ACK in response thereto to the AP MLD 310 using the second link 332.

Figure 6B:
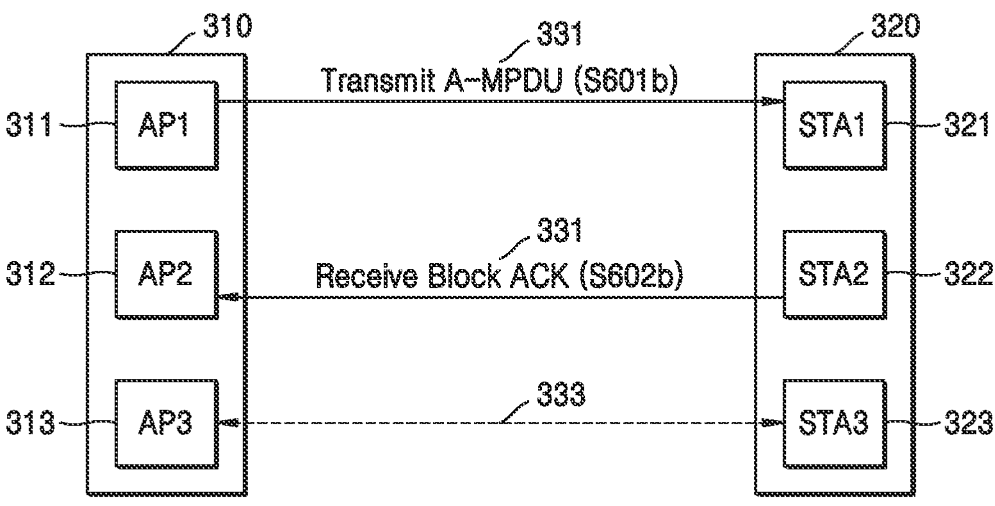

FIG. 6B illustrates an example of communication between AP MLD and non-AP MLD according to an embodiment. FIG. 6B may be described with reference to FIG. 3.

Referring to FIG. 6B, in operation S601$b$, the AP1 311 of the AP MLD 310 may transmit an A-MPDU to the STA1 321 of the non-AP MLD 420. At least one of MPDUs of the A-MPDU may include ACK policy indicating implicit BAR. Also, the A-MPDU may include additional ACK policy.

For example, the A-MPDU may further include ACK policy indicating that the first link 331 for transmission of the A-MPDU may be different from a link for transmission of block ACK.

As another example, the A-MPDU may further include ACK policy indicating reception of block ACK using the second link 332 different from the first link 331 for transmission of the A-MPDU.

In operation S602*b*, the AP2 312 may receive block ACK from the STA2 322.

For example, the non-AP MLD 320 may receive, from the AP MLD 310 using the first link 331, A-MPDU indicating that the first link 331 through which the A-MPDU is delivered may be different from a link through which block ACK is delivered. Then, the non-AP MLD 320 may select a link for transmission of block ACK, based on at least one of a state and a bandwidth of each of the first link 331, the second link 332, and the third link 333. Accordingly, the non-AP MLD 320 may select the second link 332. The STA2 322 may transmit block ACK to the AP2 312 using the second link 332. Then, the AP2 312 may receive block ACK from the STA2 322.

As another example, the non-AP MLD 320 may receive, from the AP MLD 310 using the first link 331, A-MPDU including ACK policy indicating block ACK transmission using the second link 332. Accordingly, the STA2 322 may transmit block ACK to the AP2 312 using the second link 332. Then, the AP2 312 may receive block ACK from the STA 2 322.

Figure 6C:
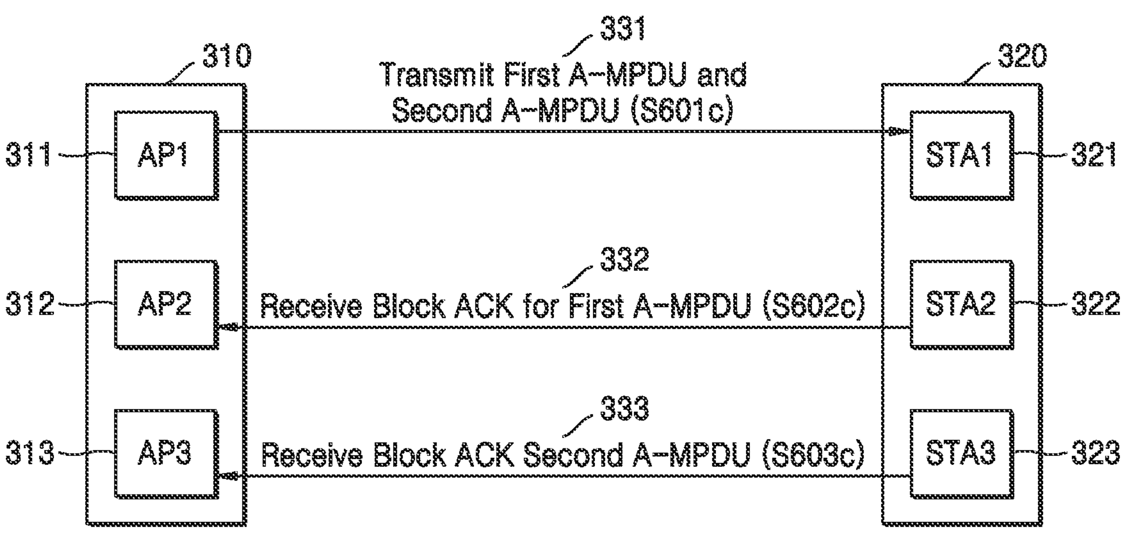

FIG. 6C illustrates an example of communication between AP MLD and non-AP MLD according to an embodiment. FIG. 6C may be described with reference to FIG. 3.

Referring to FIG. 6C, in operation S601*c*, the AP MLD 310 may transmit a first A-MPDU including MPDU 1 to MPDU 5 and second A-MPDU including MPDU 6 to MPDU 10 to the non-AP MLD 320. At least one of MPDUs of the first A-MPDU and the second A-MPDU, for example at least one of MPDU 1 to MPDU 10) may include ACK policy indicating implicit BAR. Also, the first A-MPDU and the second A-MPDU may include additional ACK policy.

For example, the first A-MPDU and the second A-MPDU may further include ACK policy indicating the first link 331 for transmission of data may be different from a link for transmission of block ACK.

As another example, the first A-MPDU may further include ACK policy indicating block ACK transmission using the second link 332 that is different from the first link 331, and the second A-MPDU may further include ACK policy indicating block ACK transmission using the third link 333 different from the first link 331.

When the first A-MPDU and the second A-MPDU further include ACK policy indicating the first link 331 for transmission of data may be different from a link for transmission of block ACK, the non-AP MLD 320 may select links for transmission of block ACK, based on at least one of the states and bandwidths of the links 321, 332, and 333 established with the AP MLD 310. For example, the non-AP MLD 320 may transmit block ACK with respect to a portion of received data using the second link 332, and may transmit block ACK with respect to the other portion of the received data using the third link 333. Accordingly, in operation S602*c*, the AP2 312 may receive block ACK with respect to the first A-MPDU from the STA2 322. In operation S603*c*, the AP3 313 may receive block ACK with respect to the second A-MPDU from the STA 3 323.

When the first A-MPDU further includes ACK policy indicating block ACK transmission using the second link 332 that is different from the first link 331, and the second A-MPDU further includes ACK policy indicating block ACK transmission using the third link 333 that is different from the first link 331, the non-AP MLD 320 may transmit block ACK with respect to the first A-MPDU (to the AP MLD 310 using the second link 332, and may transmit block ACK with respect to the second A-MPDU to the AP MLD 310 using the third link 333. Accordingly, in operation S602*c*, the AP2 312 may receive block ACK with respect to the first A-MPDU from the STA2 322. Also, in operation S603*c*, the AP3 313 may receive block ACK with respect to the second A-MPDU from the STA3 323.

Figure 6D:
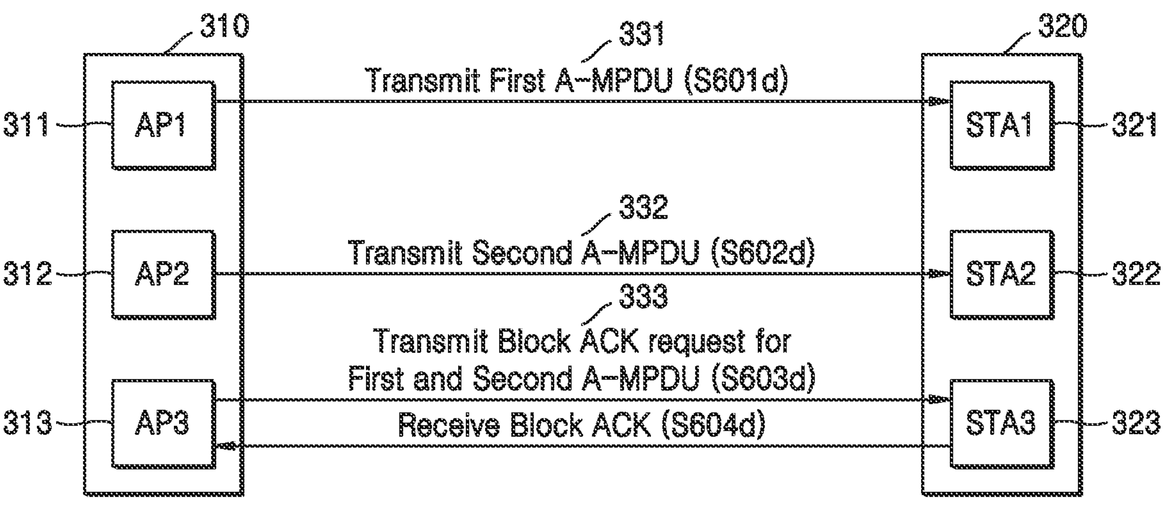

FIG. 6D illustrates an example of communication between AP MLD and non-AP MLD according to an embodiment. FIG. 6D may be described with reference to FIG. 3.

Referring to FIG. 6D, in operation S601*d*, the AP1 311 of the AP MLD 310 may transmit a first A-MPDU including MPDU 1 to MPDU 5 to the STA1 321 of the non-AP MLD 320. In operation S602*d*, the AP2 312 of the AP MLD 310 may transmit a second A-MPDU including MPDU 6 to MPDU 10 to the STA2 322 of the non-AP MLD 320.

The AP MLD 310 may check at least one of the states and bandwidth of the links 331, 332, and 333, and may determine a link through which block ACK is to be received. The AP MLD 310 may determine block ACK to be received using one link, the block ACK being associated with a plurality of items of data transmitted using one or more links. For example, the AP MLD 310 may include, in the first A-MPDU, ACK policy indicating block ACK transmission using the third link 333, and may include, in the second A-MPDU, ACK policy indicating block ACK transmission using the third link 333.

When the first A-MPDU and the second A-do not have implicit BAR but have block ACK as ACK policy, the non-AP MLD 320 may wait for a block ACK request frame.

In operation S603*d*, the AP3 313 of the AP MLD 310 may transmit a block ACK request frame with respect to the first A-MPDU and the second A-MPDU to the STA3 323 of the non-AP MLD 320.

In operation S604*d*, the AP3 313 may receive block ACK with respect to the first A-MPDU and the second A-MPDU from the STA3 323.

Figure 6E:
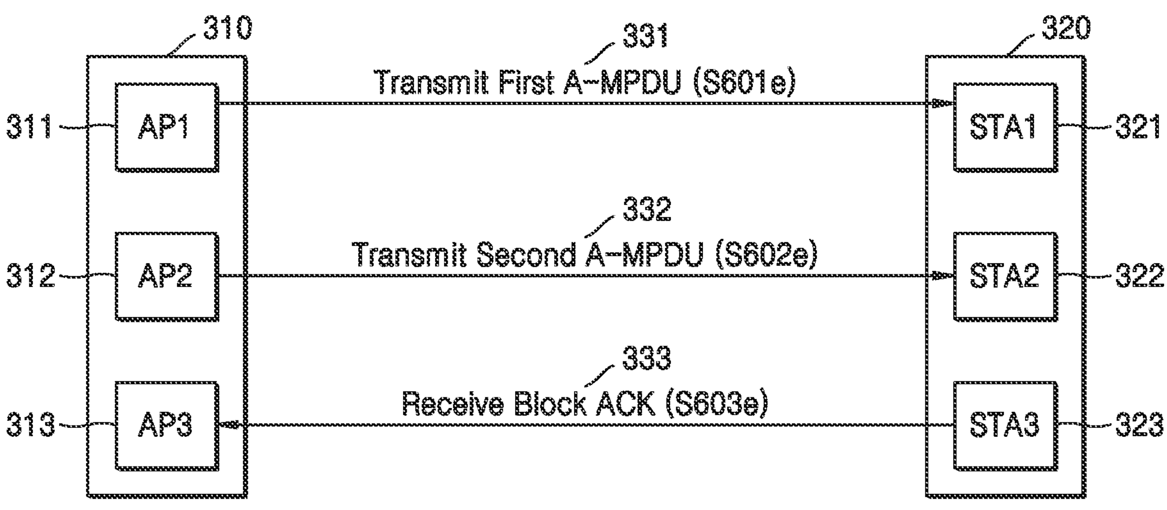

FIG. 6E illustrates an example of communication between AP MLD and non-AP MLD according to an embodiment. FIG. 6E may be described with reference to FIG. 3.

Referring to FIG. 6E, in operation S601*e*, the AP1 311 of the AP MLD 310 may transmit a first A-MPDU including MPDU 1 to MPDU 5 to the STA1 321 of the non-AP MLD 320. In operation S602*e*, the AP2 312 of the AP MLD 310 may transmit a second A-MPDU including MPDU 6 to MPDU 10 to the STA 322 of the non-AP MLD 320.

The AP MLD 310 may check at least one of the states and bandwidth of the links 331, 332, and 333, and may determine a link through which block ACK is to be received. The AP MLD 310 may determine block ACK to be received using one link, the block ACK being associated with a plurality of items of data transmitted using one or more links. For example, the AP MLD 310 may include, in the first A-MPDU, ACK policy indicating block ACK transmission using the third link 333, and may include, in the second A-MPDU, ACK policy indicating block ACK transmission using the third link 333.

At least one of the MPDUs of A-MPDU, for example at least one of MPDU 1 to MPDU 5, may have implicit BAR as ACK policy, and at least one of MPDUs of A-MPDU for example at least one of MPDU 6 to MPDU 10, may have implicit BAR as ACK policy.

In operation S603*e*, the AP3 313 may receive block ACK with respect to the first A-MPDU and the second A-MPDU from the STA3 323.

Figure 6F:
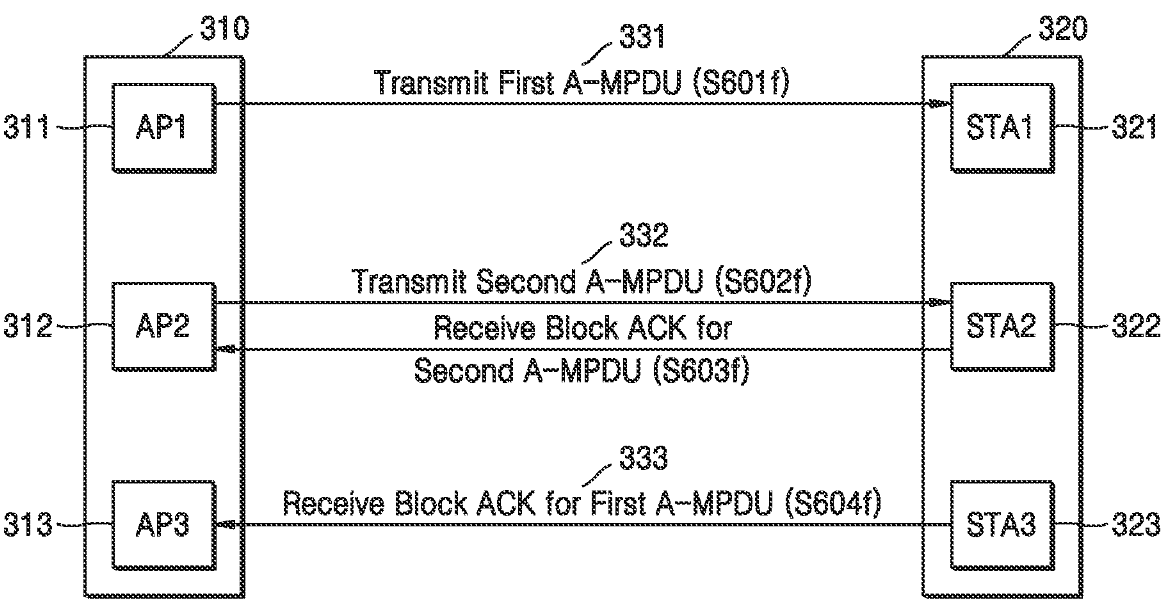

FIG. 6F illustrates an example of communication between AP MLD and non-AP MLD according to an embodiment. FIG. 6F may be described with reference to FIG. 3.

Referring to FIG. 6F, in operation S601*f*, the AP1 311 of the AP MLD 310 may transmit a first A-MPDU including MPDU 1 to MPDU 8 to the STA1 321 of the non-AP MLD 320. In operation S602*f*, the AP2 312 of the AP MLD 310 may transmit a second A-MPDU including MPDU 9 to MPDU 10 to the STA2 322 of the non-AP MLD 320. Accordingly, a data transmission amount of the first link 331 may be greater than a data transmission amount of the second link 332.

The AP MLD 310 may check at least one of the states and bandwidth of the links 331, 332, and 333, and may determine a link through which block ACK is to be received. For example, when the AP MLD 310 transmits data using the first link 331 and the second link 332, the AP MLD 310 may determine to receive, using the third link 333, block ACK with respect to the first link 331 with a great data transmission amount. The AP MLD 310 may determine to receive, using the second link 332, block ACK with respect to the second link 332 with a small data transmission amount.

Accordingly, in operation S603*f*, the AP2 312 may receive, from the STA2 322, block ACK with respect to the second A-MPDU, for example with respect to MPDU 9 to MPDU 10. In operation S604*f*, the AP3 313 may receive, from the STA3 323, block ACK with respect to the first A-MPDU, for example with respect to MPDU 1 to MPDU 8.

Figure 7A:
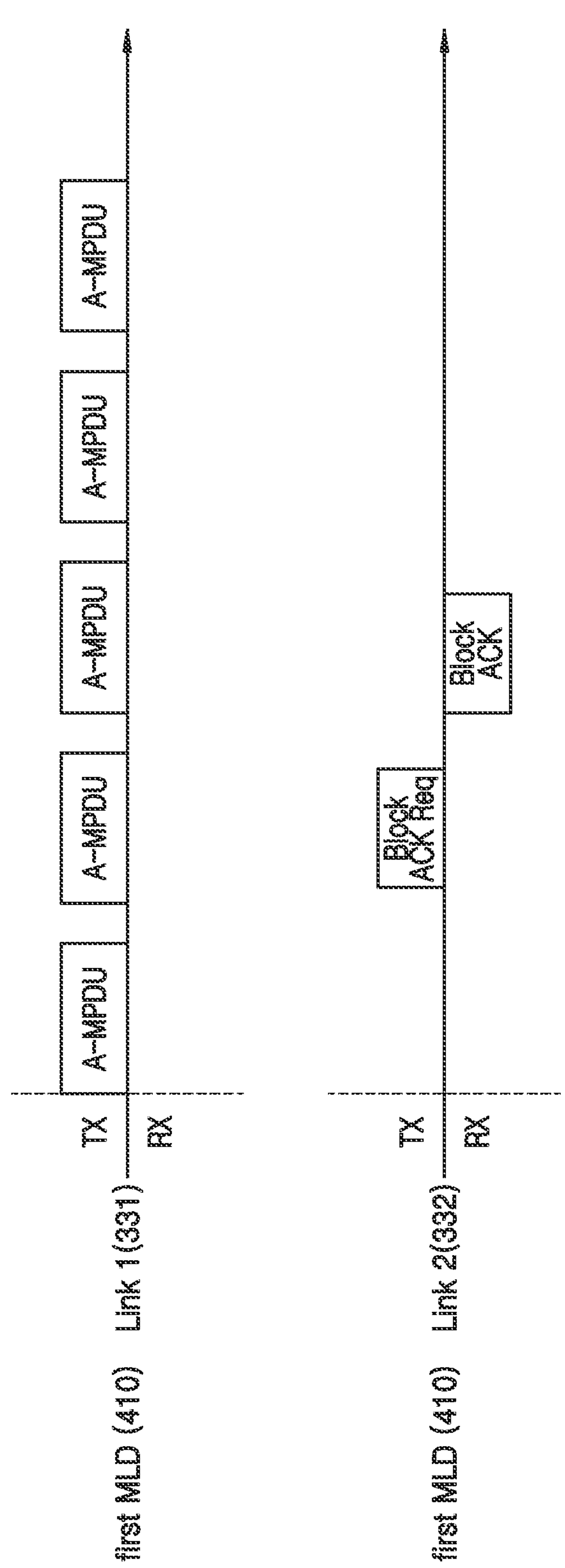
FIG. 7A illustrates an example where there is a need to change block ACK policy according to an embodiment.
Figure 7B:
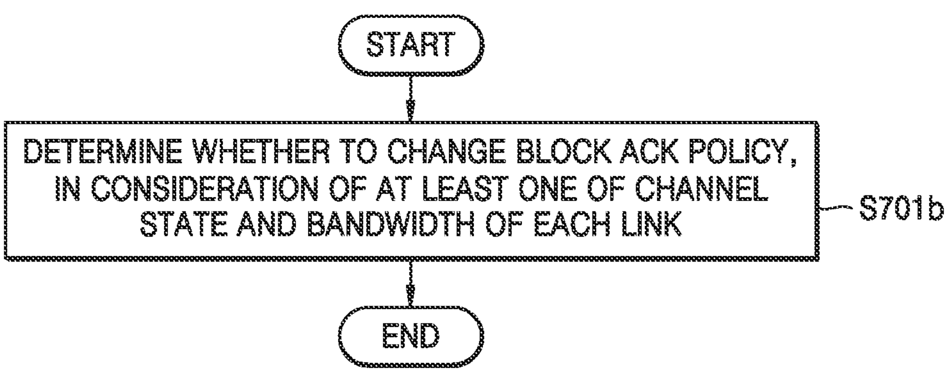
FIG. 7B illustrates an example of a procedure for changing block ACK policy according to an embodiment.

FIG. 7A illustrates an example where there is a need to change block ACK policy according to an embodiment. FIG. 7B illustrates an example of a procedure for changing block ACK policy according to an embodiment. FIG. 7A may be described with reference to FIGS. 3 and 4A.

A first MLD 410 may operate as the AP MLD 310. Referring to FIG. 7A, the first MLD 410 may repeatedly or continuously transmit A-MPDUs using the first link 331. Block ACK may be transmitted at a low rate, and thus, may take a long time to occupy a medium. Therefore, it may be efficient, in terms of throughput, to process block ACK using the second link 332 other than the first link 331 through which other data is constantly transmitted.

Referring to FIG. 7B, in operation S701*b*, the first MLD 410 may determine whether to change block ACK policy, in consideration of at least one of a channel state and a bandwidth of each link. The first MLD 410 may determine whether it is advantageous to receive block ACK using a link different from a data transmission link, based on its traffic requirements and observable values.

Figure 8:
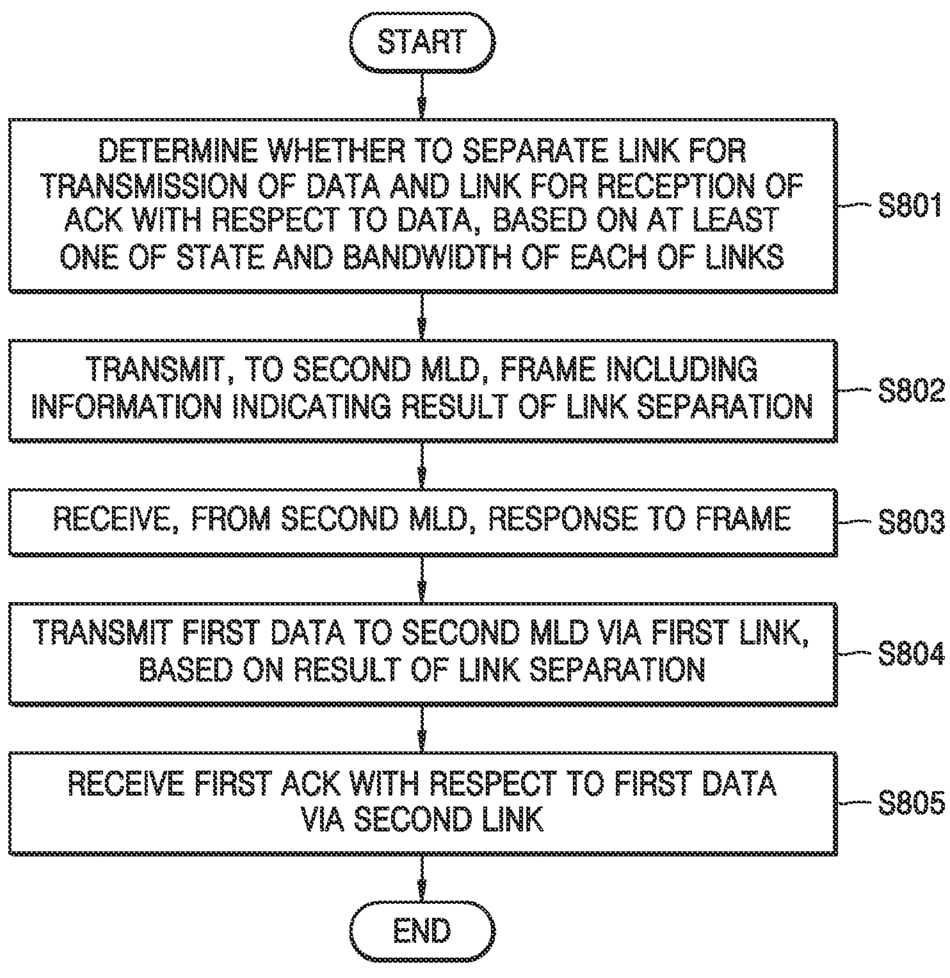
FIG. 8 illustrates an operation procedure of an MLD according to an embodiment.

FIG. 8 illustrates an operation procedure of an MLD according to an embodiment. FIG. 8 may be described with reference to FIG. 4.

An operating method of a first MLD communicating with a second MLD by using first and second links will now be described below. Referring to FIG. 8, in operation S801, the first MLD 410 may determine whether to separate a link for transmission of data and a link for reception of ACK with respect to the data, based on at least one of a state and a bandwidth of each of links.

In operation S802, the first MLD 410 may transmit, to the second MLD 420, a frame including information indicating a result of the link separation. In operation S803, the first MLD 410 may receive, from the second MLD 420, a response to the frame.

For example, the frame may be an ADDBA request frame, and the response to the frame may be an ADDBA response. When an ADD Block ACK Policy bit of a Block ACK Parameter Set field of the ADDBA request frame is 0, separation between the first link and the second link may be indicated.

As another example, the frame may be a beacon frame, and a reserved bit of an EHT capabilities element or an EHT+ capabilities element of the beacon frame may indicate separation between the first link and the second link.

As another example, the frame may be an association request frame, and a reserved bit of an EHT capabilities element or an EHT+ capabilities element of the association request frame may indicate separation between the first link and the second link.

In operation S804, the first MLD 410 may transmit first data to the second MLD 420 using the first link, based on the result of the link separation. In operation S805, the first MLD 410 may receive first ACK with respect to the first data using the second link. The first data may include information indicating separation between the first link and the second link.

For example, the first data may be A-MPDU, the first ACK may be block ACK, and the information may be an MSB of an AP PS Buffer State of a QoS control field of the A-MPDU.

A bandwidth of the first link may be greater than a bandwidth of the second link. Accordingly, the first MLD 410 may determine to transmit first data using the first link with a great bandwidth and to receive first ACK using the second link with a small bandwidth.

The first MLD 410 may transmit a block ACK request with respect to the A-MPDU to the second MLD 420. In this case, ACK Policy bit of all MPDUs of the A-MPDU may indicate Block ACK, and the received ACK may be block ACK in response to the block ACK request.

The first MLD 410 may transmit data to the second MLD 420 using a plurality of links, and may receive ACK using a link different from a link through which data with a large transmission amount is transmitted and may receive ACK using a link through which data with a small transmission amount is transmitted. For example, the first MLD 410 may communicate with the second MLD 420 by further using a third link, and may transmit second data to the second MLD 420 using the third link, based on the result of the link separation. The first MLD 410 may receive first ACK in response to the first data using the second link, and may receive second ACK in response to the second data using the third link.

Figure 9:
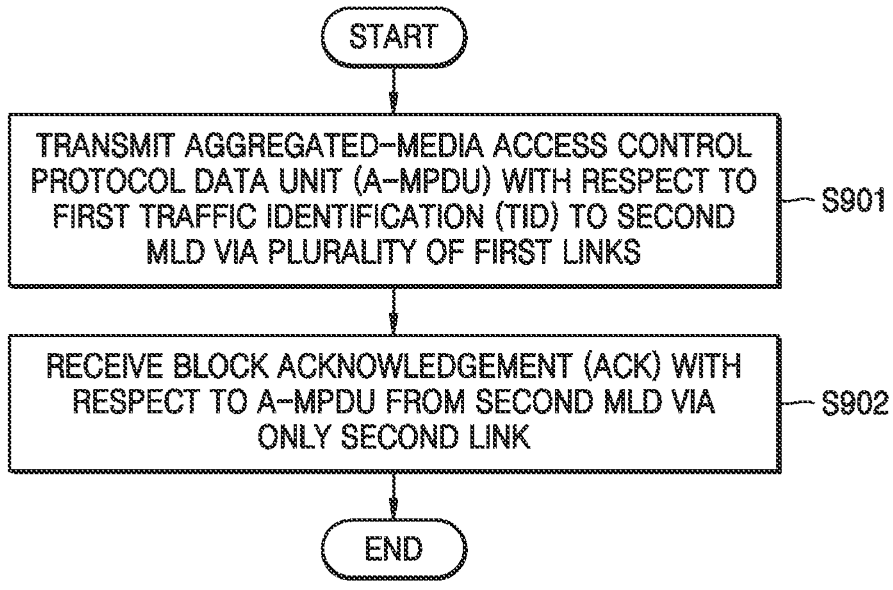
FIG. 9 illustrates an operation procedure of an MLD according to an embodiment.

FIG. 9 illustrates an operation procedure of an MLD according to an embodiment. FIG. 9 may be described with reference to FIG. 4.

Before data transmission, the first MLD 410 may transmit an ADDBA request frame with respect to first TID to the second MLD 420, and may receive an ADDBA response frame from the second MLD 420. The ADDBA request frame may include information indicating that a second link is different from a plurality of first links. For example, when an ADD Block ACK Policy bit of a Block ACK Parameter Set field of the ADDBA request frame is 0, the ADD Block ACK Policy bit may indicate a difference between the second link and the plurality of first links.

Referring to FIG. 9, in operation S901, the first MLD 410 may transmit A-MPDU with respect to first TID to the second MLD 420 using the plurality of first links.

The A-MPDU may include information indicating that the second link is different from the plurality of first links. For example, an MSB of an AP PS Buffer State of a QoS control field of the A-MPDU may indicate that the second link is different from the plurality of first links.

The first MLD 410 may determine to receive the block ACK with respect to the A-MPDU using the second link, based on at least one of each of a state and a bandwidth of the plurality of first links and the second link.

In operation S902, the first MLD 410 may receive block ACK with respect to the A-MPDU from the second MLD 420 using only the second link.

For example, the first MLD 410 may transmit a block ACK request with respect to the A-MPDU using the second link, ACK Policy bit of all MPDUs of the A-MPDU may indicate block ACK, and block ACK received by the first MLD 410 may be a response to the block ACK request.

As another example, the plurality of first links may include a third link and a fourth link, and the A-MPDU may be transmitted using the third link and the fourth link. The first MLD 410 may receive, using the third link, block ACK with respect to the A-MPDU that has been transmitted using the third link. The block ACK received using the second link may be ACK with respect to the A-MPDU that has been transmitted via the fourth link.

While exemplary embodiments have been particularly shown and described, it will be understood that various changes in form and details may be made therein without departing from the spirit and scope of the following claims.

What is claimed is:

1. An operating method of a first multi-link device (MLD), the operating method comprising:

transmitting, by the first MLD, first data to a second MLD using a first link, wherein the first MLD is configured to communicate with the second MLD using the first link and a second link, and wherein the first data comprises an aggregated-media access control protocol data unit (A-MPDU) including information indicating separation between the first link and the second link; and based on the information, receiving, by the first MLD, a first acknowledgement (ACK) with respect to the first data through the second link and not through the first link.

2. The operating method of claim 1, further comprising:

determining to separate a link for transmission of data from a link for reception of ACK corresponding to the data, based on at least one of a state and a bandwidth of each link of a plurality of links;

transmitting, to the second MLD, a frame comprising information indicating a result of the determining; and receiving a response to the frame from the second MLD, and wherein the transmitting of the first data is based on the result of the determining.

3. The operating method of claim 2, wherein the frame comprises an add block acknowledgement (ADDBA) request frame, and the response to the frame comprises an ADDBA response, and wherein an Add Block ACK Policy bit of a Block ACK Parameter Set field of the ADDBA request frame being 0 indicates the separation between the first link and the second link.

4. The operating method of claim 2, wherein the frame comprises a beacon frame, and wherein a reserved bit of an extremely high throughput (EHT) capabilities element or an EHT+ capabilities element included in the beacon frame indicates the separation between the first link and the second link.

5. The operating method of claim 2, wherein the frame comprises an association request frame, and wherein a reserved bit of an extremely high throughput (EHT) capabilities element or an EHT+ capabilities element included in the association request frame indicates the separation between the first link and the second link.

6. The operating method of claim 2, wherein the first ACK comprises a block ACK, and wherein the information comprises a most significant bit (MSB) of an access point (AP) power save (PS) buffer state of a quality of service (QOS) control field of the A-MPDU.

7. The operating method of claim 2, wherein an EHT capabilities element or an EHT+ capabilities element included in the A-MPDU indicates the separation between the first link and the second link.

8. The operating method of claim 2, further comprising:

communicating, by the first MLD, with the second MLD using a third link;

transmitting second data to the second MLD using the third link, based on the result of the determining; and receiving a second ACK with respect to the second data through the third link.

9. The operating method of claim 1, wherein a bandwidth of the first link is greater than a bandwidth of the second link.

10. The operating method of claim 1, wherein the operating method further comprises transmitting a block ACK request with respect to the A-MPDU, and wherein an ACK policy bit of all media access control protocol data units (MPDUs) included in the A-MPDU indicates a block ACK policy, and the received first ACK is a block ACK based on the block ACK request.

11. An operating method of a first multi-link device (MLD), the operating method comprising:

transmitting an aggregated-media access control protocol data unit (A-MPDU) with respect to a first traffic identification (TID) to a second MLD using a plurality of links; and receiving a block acknowledgement (ACK) with respect to at least part of the A-MPDU from the second MLD using a second link and without using the plurality of links, wherein the second link is different from the plurality of links, and wherein the A-MPDU comprises information indicating that the second link is different from the plurality of links.

12. The operating method of claim 11, further comprising transmitting a block ACK request with respect to the A-MPDU using the second link, and wherein an ACK Policy bit of all MPDUs of the A-MPDU indicates a block ACK policy, and the received block ACK comprises a response to the block ACK request.

13. The operating method of claim 11, further comprising:

transmitting an add block acknowledgement (ADDBA) request frame with respect to the first TID; and receiving an ADDBA response frame, wherein the ADDBA request frame comprises information indicating that the second link is different from the plurality of links.

14. The operating method of claim 13, wherein based on an Add Block ACK Policy bit of a Block ACK Parameter Set field of the ADDBA request frame being 0, the Add Block ACK Policy bit indicates that the second link is different from the plurality of links.

15. The operating method of claim 11, wherein a most significant bit (MSB) of an access point (AP) power save (PS) buffer state of a quality of service (QoS) control field of the A-MPDU indicates that the second link is different from the plurality of links.

16. The operating method of claim 11, further comprising determining to receive the block ACK with respect to the A-MPDU using the second link, based on at least one of a state and a bandwidth of each of the plurality of links and the second link.

17. The operating method of claim 11, wherein the A-MPDU comprises a first A-MPDU and the block ACK comprises a first block ACK, wherein the plurality of links comprises a third link and a fourth link, wherein the first A-MPDU is transmitted using the third link and a second A-MPDU is transmitted using the fourth link, and wherein a second block ACK with respect to the second A-MPDU is received through the fourth link.

18. A first multi-link device (MLD), comprising:

a transceiver; and a processor coupled with the transceiver and configured to:

control the transceiver to transmit first data to a second MLD using a first link, wherein the first MLD is configured to communicate with the second MLD using the first link and a second link, and wherein the first data comprises an aggregated-media access control protocol data unit (A-MPDU) including information indicating separation between the first link and the second link, and based on the information, receive a first acknowledgement (ACK) with respect to the first data through the second link and not through the first link.

* * * * *